(No Model.)

W. J. ROSS.
SPROCKET WHEEL.

No. 571,398. Patented Nov. 17, 1896.

WITNESSES.
Matthew M. Blunt.
C. W. Wilbur

INVENTOR.
William J. Ross,
By O. M. Shaw
ATT'YS.

UNITED STATES PATENT OFFICE.

WILLIAM J. ROSS, OF BOSTON, MASSACHUSETTS.

SPROCKET-WHEEL.

SPECIFICATION forming part of Letters Patent No. 571,398, dated November 17, 1896.

Application filed January 17, 1896. Serial No. 575,841. (No model.)

*To all whom it may concern:*

Be it known that I, WILLIAM J. ROSS, of Boston, in the county of Suffolk, State of Massachusetts, have made certain new and useful Improvements in Sprocket-Wheels for Bicycles, of which the following is a description sufficiently full, clear, and exact to enable any person skilled in the art or science to which said invention appertains to make and use the same, reference being had to the accompanying drawings, in which—

Figure 1:
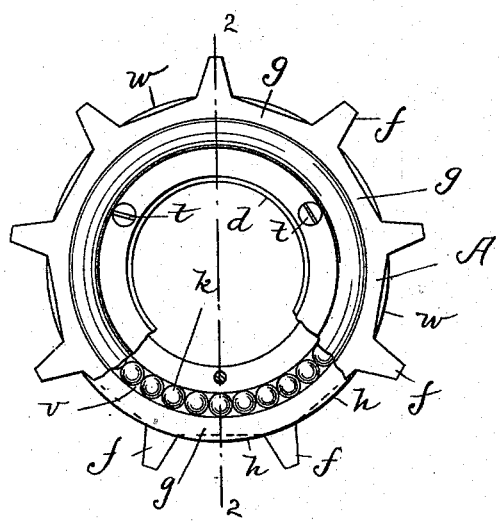
Figure 2:
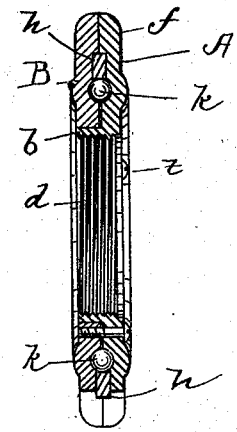

Figure 1 is a side elevation of my improved sprocket, a side plate being represented as broken away; Fig. 2, a section on line 2 2 in Fig. 1, and Figs. 3 and 4 sections illustrating modifications.

Like letters of reference indicate corresponding parts in the different figures of the drawings.

The object of my invention is especially to provide means for reducing the friction of the jack-chain on the periphery of the wheel between the teeth, whereby the life of the wheel is very considerably lengthened, and said wheel can be driven with less expenditure of power with the same results than can many of ordinary construction.

In carrying out my improvement I make use of means which will be readily understood by those conversant with such matters from the following explanation.

In the drawings, A B represent the plates from which the wheel is formed. The plate or member A is flanged at $b$, forming the hub, which is interiorly screw-threaded at $d$ to turn onto a hub. The members A B are connected by screws $t$, and the teeth $f$ project radially from said members. The spaces $g$ between the teeth on the periphery of the wheel are flat or in lines tangent to the circle of said wheel. The plates or members are grooved on their inner faces, forming a ball-race $v$, in which balls $k$ are disposed and fitted to rotate. A ring $h$, disposed between the plates, bears on these balls and forms the top of the race. This ring revolves freely on the balls, and its outer edge $w$ is exposed on the periphery of the wheel between the teeth $f$, as shown in Fig. 1.

Jack-chains connecting two wheels are usually slack, and in constant use they wear the periphery of the wheels between the teeth. The links are usually longer than the thickness of the teeth, and before the end of the link engages said tooth to drive the wheel there is a slight lost motion. By use of the friction-ring I compensate to a great degree for this wear and cause the links to engage much more quickly, saving power and adding to the speed.

The wheel is mounted on an axle in the usual manner. The jack-chain is engaged by the teeth $f$ and, passing between said teeth, contacts with the edge $w$ of the ring $h$. As said ring rotates freely the friction of the chain on the wheel is thereby greatly reduced in a manner which will be understood without a more explicit description.

Figure 3:
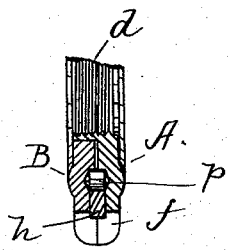
Figure 4:
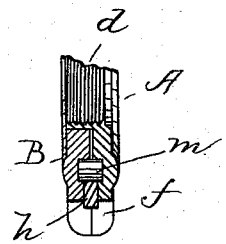

Fig. 1 shows the balls substituted by a roller $m$, and in Fig. 3 a roller $p$, provided with conical ends, is employed.

The ring $h$, arranged in the manner described, is a salient feature of my invention, and any suitable means of mounting the same may be substituted for that shown without departing from the spirit of my invention.

Having thus described my invention, what I claim is—

1. A sprocket-wheel provided with an antifriction device on its periphery between its teeth and adapted to be engaged by the jack-chain substantially as and for the purpose specified.

2. A sprocket-wheel comprising two members secured together and provided with teeth; a ring contained between said members and mounted to revolve on a roller-bearing, the outer edge of said ring projecting beyond the corresponding edges of said members between said teeth substantially as and for the purpose set forth.

3. The herein-described sprocket-wheel comprising the members, A, B, detachably secured together; the ball-bearings, $k$, and the ring, $h$, fitted to travel on said balls and projecting between the teeth, $f$, of said members as described.

WILLIAM J. ROSS.

Witnesses:
O. M. SHAW,
C. W. WILBUR.